(12) United States Patent
Davidowitz et al.

(10) Patent No.: US 9,431,692 B2
(45) Date of Patent: Aug. 30, 2016

(54) TRACKING BIOLOGICAL AND OTHER SAMPLES USING RFID TAGS

(75) Inventors: Hananel Davidowitz, Princeton, NJ (US); Thomas Coradetti, Belle Mead, NJ (US); Theodore Altman, East Windsor, NJ (US); Roni Or, Moshav Bney Atarot (IL)

(73) Assignee: BioTillion, LLC, Princeton, NJ (US)

( * ) Notice: Subject to any disclaimer, the term of this patent is extended or adjusted under 35 U.S.C. 154(b) by 1132 days.

(21) Appl. No.: 13/437,980

(22) Filed: Apr. 3, 2012

(65) Prior Publication Data
US 2012/0256806 A1    Oct. 11, 2012

Related U.S. Application Data

(60) Provisional application No. 61/472,693, filed on Apr. 7, 2011.

(51) Int. Cl.
*H01Q 1/22* (2006.01)
*G01S 13/75* (2006.01)
*H01Q 7/00* (2006.01)
*B01L 3/00* (2006.01)
*B01L 7/00* (2006.01)
*B01L 9/06* (2006.01)

(52) U.S. Cl.
CPC ............ *H01Q 1/2225* (2013.01); *B01L 3/5453* (2013.01); *B01L 7/50* (2013.01); *B01L 9/06* (2013.01); *G01S 13/751* (2013.01); *H01Q 1/2216* (2013.01); *H01Q 7/00* (2013.01); *B01L 2200/025* (2013.01); *B01L 2200/147* (2013.01); *B01L 2300/022* (2013.01)

(58) Field of Classification Search
CPC .. H01Q 13/10; H01Q 1/2208; H01Q 1/2216; H01Q 1/2225; H01Q 7/00; H04Q 5/22; G08B 1/08; G08B 13/14; G06K 9/00; G01N 1/00; G06F 17/00; G06F 19/00
USPC ...... 343/700 MS, 866, 767; 340/572.7, 10.1, 340/10.5, 572.1, 572.4, 572.8
See application file for complete search history.

(56) References Cited

U.S. PATENT DOCUMENTS

| | | | |
|---|---|---|---|
| 2,975,496 | A | 3/1961 | McGraw |
| 3,896,958 | A | 7/1975 | Robbins et al. |
| 5,533,970 | A | 7/1996 | Berger et al. |
| 5,565,858 | A | 10/1996 | Guthrie |

(Continued)

FOREIGN PATENT DOCUMENTS

| DE | 20121738 U1 | 9/2003 |
|---|---|---|
| WO | WO2004102330 A2 | 11/2004 |

OTHER PUBLICATIONS

Notice of Allowance; Mailed Dec. 21, 2012 for the corresponding U.S. Appl. No. 12/787,729.

(Continued)

*Primary Examiner* — Hoang V Nguyen
(74) *Attorney, Agent, or Firm* — Mendelsohn Dunleavy, P.C.; Steve Mendelsohn

(57) ABSTRACT

A box mapper has (i) a frame configured to receive a sample box of RFID-tagged sample vials and (ii) a set of antennae configured to read the vial RFID tags of the sample vials to determine the identity and position of each sample vial in the sample box. In one embodiment, the set of antennae include two mutually orthogonal subsets of biphase digit antennae.

53 Claims, 14 Drawing Sheets

(56) References Cited

U.S. PATENT DOCUMENTS

| | | | |
|---|---|---|---|
| 5,721,531 A | 2/1998 | Garver et al. | |
| 5,777,303 A | 7/1998 | Berney | |
| 6,084,515 A | 7/2000 | Maitin et al. | |
| 6,405,102 B1 | 6/2002 | Swartz et al. | |
| 6,549,135 B2 | 4/2003 | Singh et al. | |
| 6,652,812 B1 | 11/2003 | Vartiainen et al. | |
| 6,658,218 B2 | 12/2003 | Krolczyk et al. | |
| 6,791,432 B2 * | 9/2004 | Smith | H01Q 1/364 333/219 |
| 6,829,520 B1 * | 12/2004 | Green | G01K 3/04 235/385 |
| 6,831,552 B2 | 12/2004 | Lin | |
| 7,070,053 B1 | 7/2006 | Abrams et al. | |
| 7,091,864 B2 | 8/2006 | Veitch et al. | |
| 7,327,266 B2 | 2/2008 | Watanabe et al. | |
| 7,646,354 B2 | 1/2010 | Martin et al. | |
| 7,661,591 B2 | 2/2010 | Dearing et al. | |
| 7,838,844 B2 | 11/2010 | Wagner et al. | |
| 7,930,066 B2 | 4/2011 | Eliuk et al. | |
| 8,035,485 B2 | 10/2011 | Fritchie | |
| 8,049,626 B2 | 11/2011 | Sakama et al. | |
| 8,115,599 B2 | 2/2012 | Harazin et al. | |
| 8,378,827 B2 * | 2/2013 | Davidowitz | G01S 13/878 312/400 |
| 8,438,951 B1 | 5/2013 | McCabe et al. | |
| 8,502,645 B2 * | 8/2013 | Thomas | F25D 29/00 340/10.1 |
| 8,872,627 B2 * | 10/2014 | Davidowitz | B01L 3/545 206/459.5 |
| 2002/0023441 A1 | 2/2002 | Bara et al. | |
| 2003/0095253 A1 | 5/2003 | Chow | |
| 2005/0060062 A1 | 3/2005 | Walker et al. | |
| 2005/0069861 A1 | 3/2005 | Zimmermann et al. | |
| 2007/0109130 A1 | 5/2007 | Edenfield | |
| 2007/0171075 A1 | 7/2007 | Ryu | |
| 2007/0296599 A1 | 12/2007 | Wang et al. | |
| 2008/0106388 A1 | 5/2008 | Knight | |
| 2008/0131629 A1 | 6/2008 | Chisholm et al. | |
| 2008/0149584 A1 | 6/2008 | Martinelli | |
| 2008/0186147 A1 | 8/2008 | Carmeli | |
| 2008/0231157 A1 | 9/2008 | Lowe | |
| 2009/0242446 A1 | 10/2009 | Abbott et al. | |
| 2009/0306620 A1 | 12/2009 | Thilly et al. | |
| 2010/0102967 A1 | 4/2010 | Lee et al. | |
| 2010/0302040 A1 | 12/2010 | Davidowitz et al. | |
| 2011/0127273 A1 * | 6/2011 | Deane | A61J 1/00 220/592.2 |

OTHER PUBLICATIONS

Invitation to Pay Additional Fees and Partial Search; Mailed Jul. 3, 2012 for the corresponding PCT Application No. PCT/US2012/032699.

International Search Report and Written Opinion; Mailed Sep. 7, 2012 for the corresponding PCT Application No. PCT/US2012/032699.

Non-Final Office Action; Mailed Apr. 1, 2011 for corresponding U.S. Appl. No. 12/064,748.

Restriction Requirement; Mailed Jan. 3, 2012 for corresponding U.S. Appl. No. 12/064,748.

Final Office Action; Mailed Jul. 12, 2012 for corresponding U.S. Appl. No. 12/064,748.

Notice of Allowance; Mailed Aug. 22, 2012 for corresponding U.S. Appl. No. 12/064,748.

Non-Final Office Action; Mailed Oct. 3, 2012 for corresponding U.S. Appl. No. 12/787,729.

Lindsay, Jeffrey D. et al., "Cascading RFID Tags", IP.com Prior Art Database, Dec. 23, 2003, Retrieved from the Internet: <URL: www.ip.com > [retrieved on Jan. 18, 2007].

* cited by examiner

TRACKING BIOLOGICAL AND OTHER SAMPLES USING RFID TAGS

CROSS-REFERENCE TO RELATED APPLICATIONS

This application claims the benefit of the filing date of U.S. provisional application No. 61/472,693, filed on Apr. 7, 2011, the teachings of which are incorporated herein by reference in their entirety.

The subject matter of this application is related to the subject matter of U.S. patent application Ser. No. 12/064,748 ("the '748 application"), filed on Feb. 25, 2008, U.S. patent application Ser. No. 12/787,729 ("the '729 application"), filed on May 26, 2010, and U.S. patent application Ser. No. 13/026,359 ("the '359 application"), filed on Feb. 14, 2011, the teachings of all of which are incorporated herein by reference in their entirety (collectively "the related applications").

BACKGROUND

1. Field of the Disclosure

The present disclosure relates to RFID tags and, more specifically but not exclusively, to using RFID tags to identify and track samples, such as biological samples stored in freezers.

2. Description of the Related Art

This section introduces aspects that may help facilitate a better understanding of the disclosure. Accordingly, the statements of this section are to be read in this light and are not to be understood as admissions about what is prior art or what is not prior art.

A biobank (also known as a biorepository) can contain many sample boxes of RFID-tagged vials. Each sample box can hold on the order of 100 vials. To locate a particular sample, it is desirable to map the box contents. Mapping of the box contents serves several purposes. First, a biobank can hold millions of samples, and it is important to know where a particular sample is. Second, when retrieving a sample, it is useful to know where that particular sample is so that it can be retrieved quickly. Finally, when samples are added to a biobank, their locations need to be registered in the biobank database. As such, a method for adding a sample to the bio bank would be useful. A tool that would read all of the sample information without manual intervention would be of greater value and greatly increase the value of the biobank by reducing human errors in the sample acceptance process.

Typically, vials are removed from or added to a sample box one by one, and information for each vial is recorded, by reading and entering the human readable information on the vial and/or by scanning using a 1D or 2D barcode reader. Box mappers exist that can scan vials with 2D barcodes on the bottoms of the vials. However, this type of system cannot read through frost and ice. Removal of the frost or ice can contribute to sample thawing due to the time spent in the cleaning and also due to the cleaning method itself, which is usually done using alcohol.

SUMMARY

In one embodiment of the disclosure, an apparatus has a box mapper, the box mapper comprising (i) a frame configured to receive a sample box of RFID-tagged sample vials and (ii) a set of antennae configured to read the vial RFID tags of the sample vials to determine the identity and position of each sample vial in the sample box.

In another embodiment of the disclosure, an apparatus comprises a biphase digit antenna having an elongated shape with its length greater than its width. The biphase digit antenna comprises (i) a first antenna conductor corresponding to a first half of the elongated shape of the biphase digit antenna, (ii) a second antenna conductor corresponding to a second half of the elongated shape of the biphase digit antenna, and (iii) a biphase converter configured to convert an applied signal into a first signal component and a second signal component, out of phase with the first signal component, wherein the first signal component is applied to the first antenna conductor, and the second signal component is applied to the second antenna conductor.

In yet another embodiment of the disclosure, a vial reader comprises (i) a frame configured to receive a sample vial having a vial RFID tag, (ii) an antenna configured to read the vial RFID tag, with the sample vial received by the frame, and (iii) a camera configured to image the sample vial, with the sample vial received by the frame.

In yet another embodiment of the disclosure, an RFID tag comprises (i) an RFID antenna formed of a split metal ring having a gap and (ii) an RFID die electrically connected to the RFID antenna via wires.

In yet another embodiment of the disclosure, a freezer for storing sample boxes containing sample vials comprises (i) a freezer door configured to provide access to the freezer's interior, (ii) freezer electronics configured to communicate with an external computer located outside of the freezer, and (iii) a plurality of shelves located within the freezer's interior. Each shelf is configured to receive one or more sample boxes. Each shelf has at least one box RFID reader configured to read a box RFID tag of a tagged sample box received by the shelf. Each shelf has shelf electronics configured to communication with the box RFID reader and with the freezer electronics, such that, when a box RFID reader reads the box RFID tag of the tagged sample box, information corresponding to the identity of the tagged sample box is communicated (i) from the box RFID reader to the corresponding shelf electronics, (ii) from the corresponding shelf electronics to the freezer electronics, and (iii) from the freezer electronics to the external computer to enable a user of the external computer to determine the identity of the tagged sample box on the corresponding shelf without opening the freezer door.

In yet another embodiment of the disclosure, a socket for receiving a sample vial comprises (i) a tube configured to receive the sample vial, (ii) one or more metallic springs configured to be deformed when the sample vial is received by the tube, and (iii) at least one temperature sensor mounted on a corresponding metallic spring. The metallic spring provides a thermal conductive path between the sample vial and the temperature sensor, and the temperature sensor enables a temperature history for the sample vial to be generated.

BRIEF DESCRIPTION OF THE DRAWINGS

Other aspects, features, and advantages of the present disclosure will become more fully apparent from the following detailed description, the appended claims, and the accompanying drawings in which like reference numerals identify similar or identical elements.

FIGS. 2(A) and 2(B) show two different representations of the map generated using the box mapper of FIG. 1;

DETAILED DESCRIPTION

Box Mapper

Figure 1:
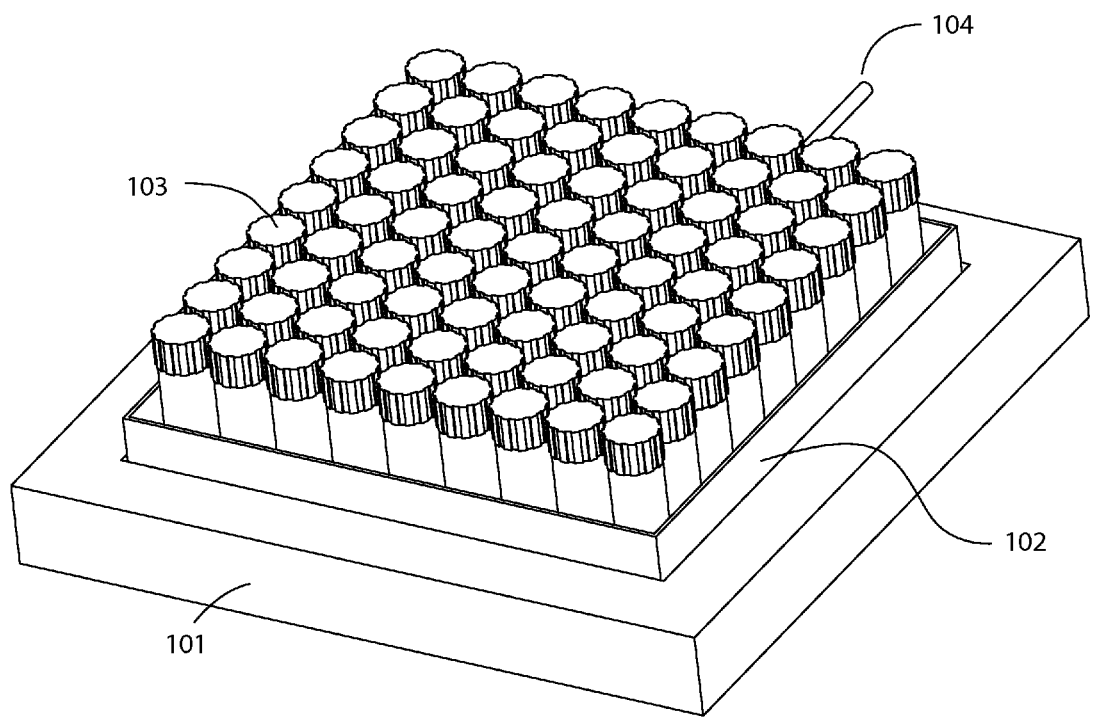
FIG. 1 shows an isometric view of a box mapper used to map a sample box of RFID-tagged sample vials.

FIG. 1 shows an isometric view of a box mapper 101 designed and configured to map the identity and location of up to 81 different RFID-tagged sample vials 103 stored in a (9×9) sample box 102. The user will place sample box 102 (shown without a cover for clarity) containing vials 103 within the frame of box mapper 101. In one implementation, the box mapper may be connected to a computer using an internet, USB, FireWire, or other suitable connection via cable 104. In either the same implementation or an alternative implementation, for handheld units, the box mapper may be connected to a computer wirelessly using a suitable wireless link (not shown). Once the sample box is placed on the box mapper, and the mapping procedure is initiated, the box mapper will proceed to read the RFID tag (not shown) located in the bottom of each vial until all of the vial positions have been interrogated. The end result of this mapping procedure is a map of the box contents indicating the identities and positions of all of the samples in the box. Depending on the implementation, the mapping can be initiated either automatically (e.g., as soon as the box mapper detects the presence of a sample box or manually by the user.

Figure 2:
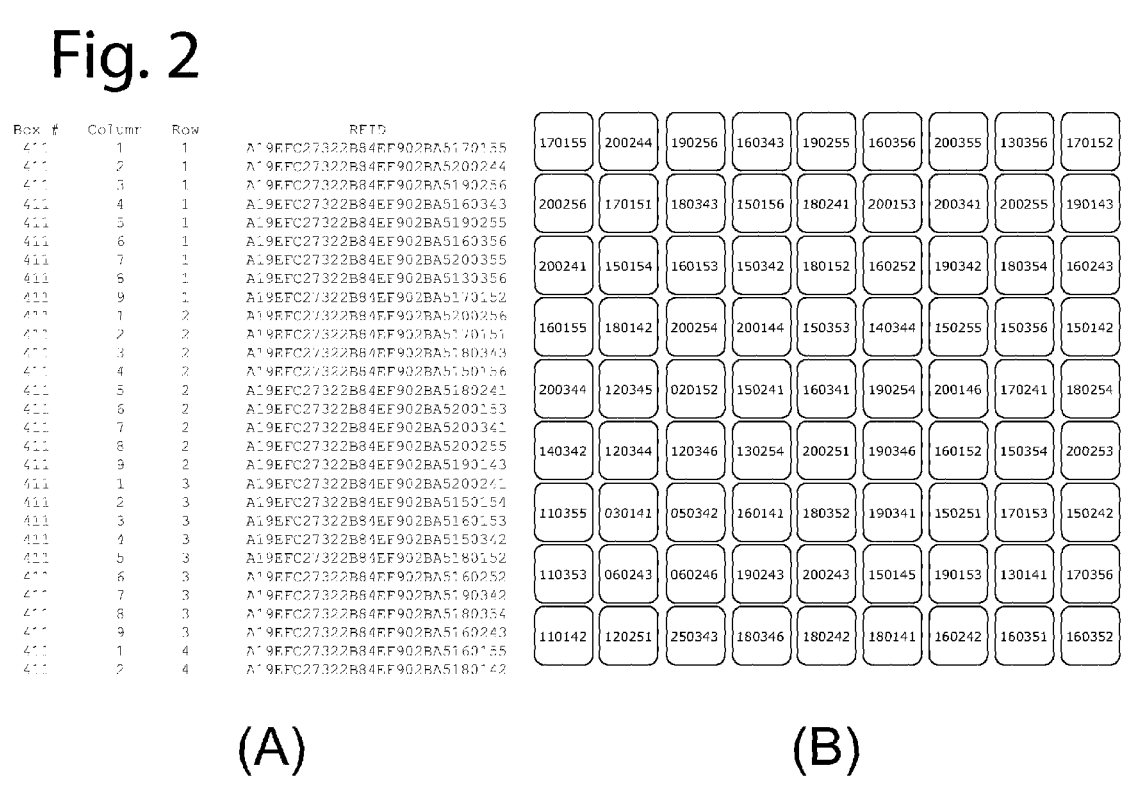

The box map, once it is transferred to the computer, can be used in a database or displayed on a computer screen or both. FIG. 2(A) shows what the first few rows of the map might look like in text form for a box of similar (9×9) organization as that shown in FIG. 1. Once acquired, this map can be presented to the user in a graphical manner if needed as shown in FIG. 2(B). Only some of data is shown in the graphical map to alleviate cluttering.

By reading the contents of an entire sample box, the time needed to add the sample information to the database can be greatly reduced. In addition, errors can be reduced by eliminating the need for human logging of the vial information.

Figure 3:
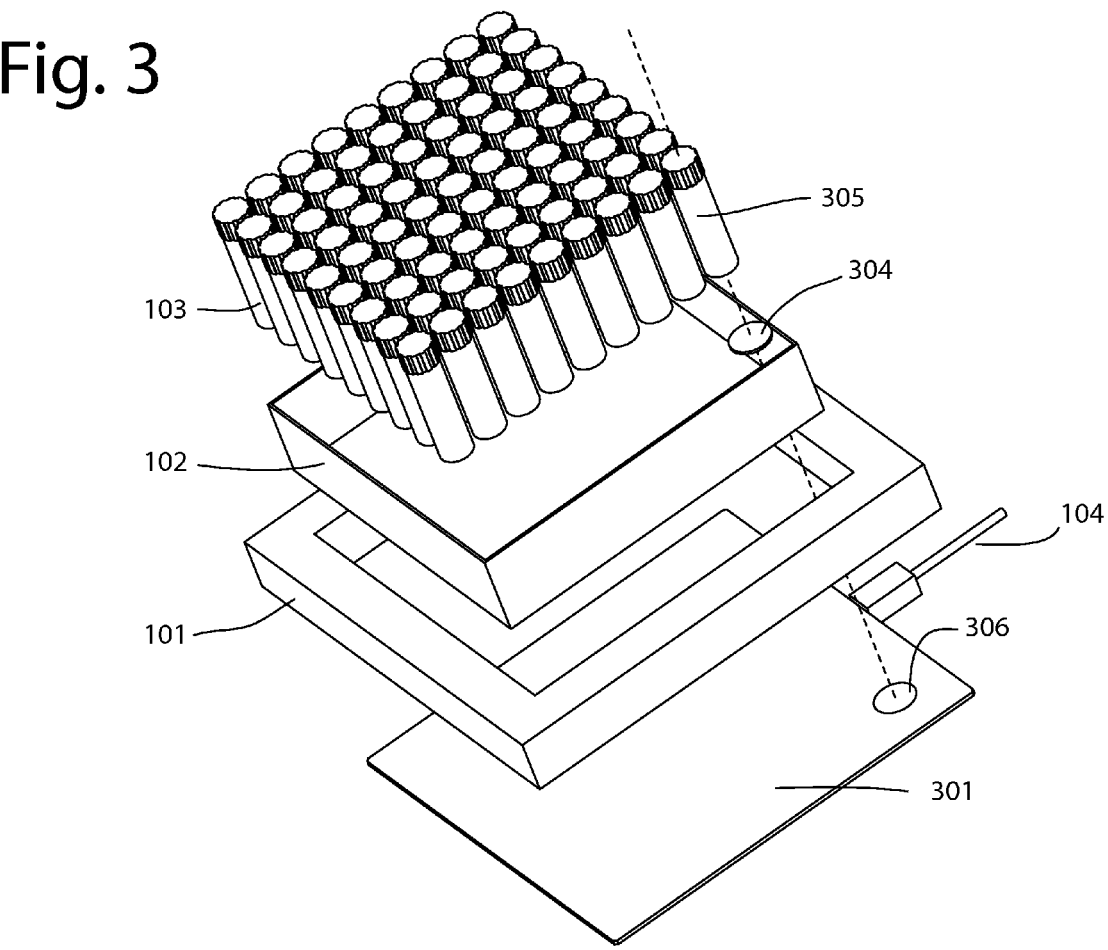
FIG. 3 shows an exploded view of the box mapper configuration of FIG. 1.

FIG. 3 shows an exploded view of the box mapper configuration of FIG. 1. A printed circuit board 301 containing antennae (e.g., 306), as described in the related applications, will read the RFID tag (not shown) attached to the bottom of each vial 103. Each possible vial position is queried, and the corresponding vial response, if any, is recorded. Using this information, a map can be assembled indicating which vial, if any, is in each possible vial position in the sample box 102.

In addition to the vials, each box 102 can contain an RFID box tag 304 attached to the bottom of the box directly under one of the vial positions near a corner. Thus, the antenna 306, or combination of antennae, that reads the vial position corresponding to vial 305 will read two RFID tags: that of vial 305 and box tag 304. The dotted axis line in FIG. 3 indicates that vial 305 is aligned with the corner-located box tag 304, although, in other implementations, the box tag could be located under any other vial.

On the upper surface of the box mapper that is visible to the user, a decal can be added that shows the box organization that the box mapper is designed to read (e.g., (8×8), (9×9), (10×10)).

The box tag will have information programmed into it indicating that it is a box tag and not a vial tag. This information will allow the box mapper to orient the map of the box correctly in any display viewed by the user. Note that, in this implementation, there is only one box tag 304, so knowing its location relative to the box mapper unambiguously determines the box orientation. Sample boxes inadvertently placed upside down on the box mapper will not be read due to the increased distance between the read antennae and the tags (e.g., 1-2 mm for a right-side-up box vs. 50 mm for an up-side-down box) so the box orientation cannot be misinterpreted.

The box mapper may have one of several possible antennae configurations for reading boxes divided into a particular grid pattern. Typically, boxes are divided into (8×8), (9×9), and (10×10) grids although other configurations are possible. The box tag 304 will contain information from which this organization can be unambiguously determined. This information can be used to alert the user that, for example, he is trying to read a box divided into a (10×10) grid on a box mapper that was designed to read a (9×9) grid. Since the external box dimensions may be identical, it is possible to do this.

Box-Tracking System

Figure 4:
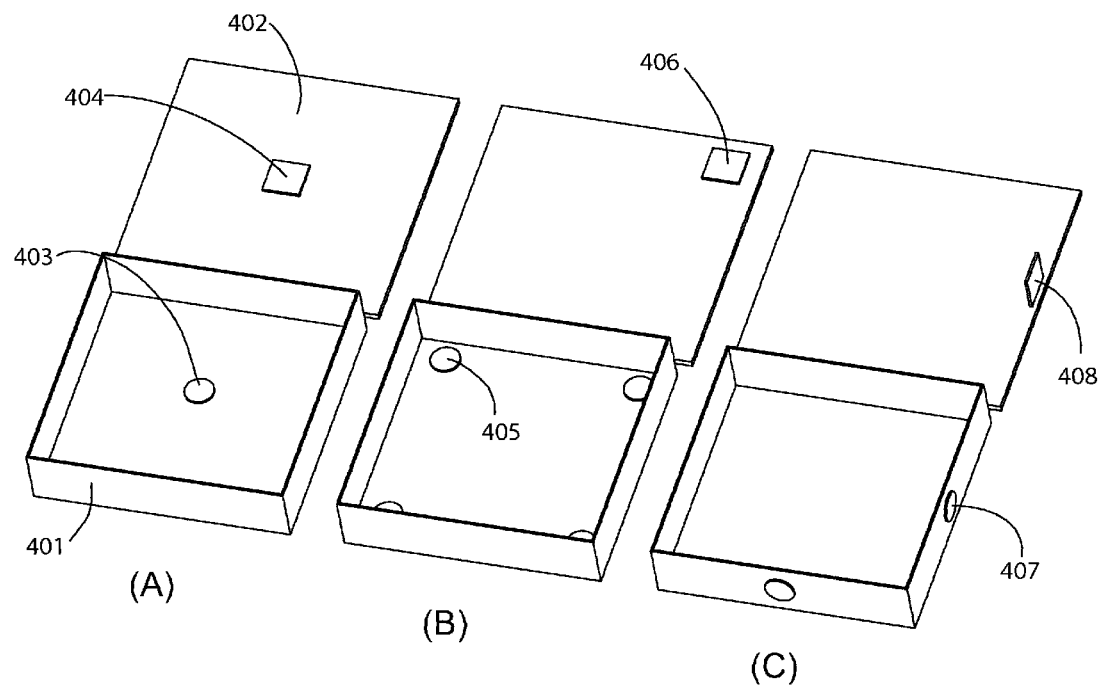
FIGS. 4(A)-4(C) show three possible embodiments of sample boxes for exemplary box-tracking systems.

Box tag 304 can also be used to track sample box 102 itself in a system that tracks sample boxes in a freezer, using some of the technology described in the '748 application. In one implementation of such a box-tracking system, there may be a single read antenna for each sample box located in each possible box location in the removable shelves or racks that hold the boxes in the freezer. But other organizations are possible. FIG. 4 shows three possible embodiments of sample boxes for exemplary box-tracking systems. In this figure, to show the geometry clearly, the sample box bottoms (e.g., 401) are shown shifted in relation to the box mappers (e.g., 402) on which they rest. In FIG. 4(A), box tag 403 is located at the center of box bottom 401 so that any of the four possible box orientations (i.e., 90-degree rotations with respect to the normal axis through box tag 403) will allow box tag 403 to be read by box mapper antenna 404 located directly below it. Alternatively, four tags 405 can be placed in the four corners of the box as shown in Fig J(B) and can be read by a corner-located antenna 406. In yet another embodiment, the tags 407 can be placed on the four sides of the box and be read by antennae that are sensitive to tags (e.g., 408) located in planes plane that are perpendicular to the bottom of the box. Other embodiments are possible, for example, where, referring to Fig J(B), four antennae (analogous to antenna 406) are located in the four corner locations, while there is only one corner box tag (analogous to tags 405) in the box.

Box Mapper with Temperature Monitoring

In biobanks, knowing the integrity of a biological sample is often critical. This involves knowing that the sample was prepared properly. But, just as importantly, it is often critical to know that the sample was stored and handled properly.

For example, if a sample is properly stored in a freezer, then its integrity is assumed to be stable until it is removed from the freezer. During the course of routine lab work, the sample might be removed from the freezer and handled in some way. Once it is returned to the freezer, there is no way of knowing if the sample was kept frozen or if it was allowed to thaw out or even warm up. If it was thawed or even warmed, then the sample integrity can be significantly compromised. Multiple thaw/freeze cycles can further degrade the sample.

A system is proposed herein in which temperature history of a sample is recorded and then stored in the data base with other sample information.

Figure 5:
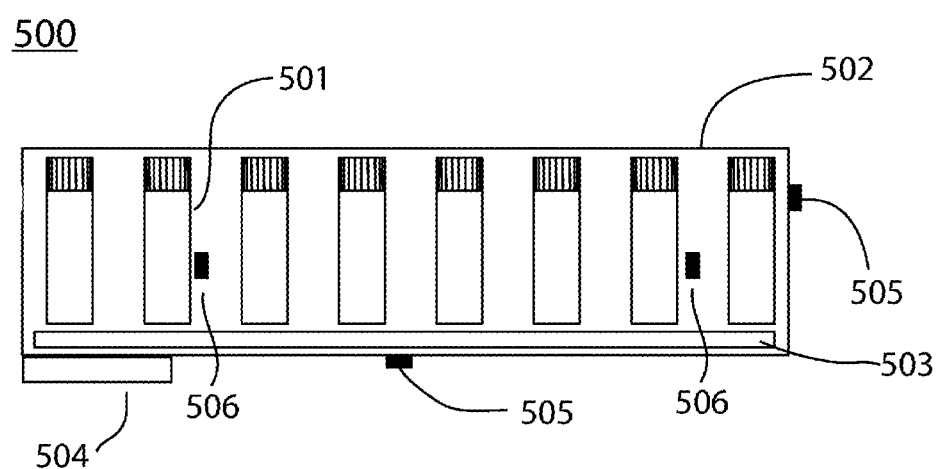
FIG. 5 shows a cross sectional view of a proposed solution for determining the temperature history of samples stored in a box of RFID-tagged vials.

FIG. 5 shows a cross sectional view of a proposed solution 500 for determining the temperature history of samples. Vials 501 are placed in a container 502. The container 502 contains circuitry 503 that reads the contents of the container. Circuitry 503 may map the individual vial positions such as in the desktop mapper shown in FIG. 1, or it may simply indicate that a certain vial is present but not give an indication of its position in the container.

The container 502 contains one or more temperature sensors located externally (505) or internally (506) to the container, or both. These temperature sensors are wired (not shown) to circuitry 504 that logs the temperature of the sensor(s) 505 and 506 at predetermined time intervals. When the container is connected to a computer, the temperature history of the samples contained therein can be transferred to the database. Alternatively, information can be transferred in real time using a wireless connection, if needed. Additionally, the container may produce an audible (e.g., beep) or visible (e.g., flashing light) alarm if the temperature strays from a specified range (e.g., above a specified temperature threshold).

Figure 6:
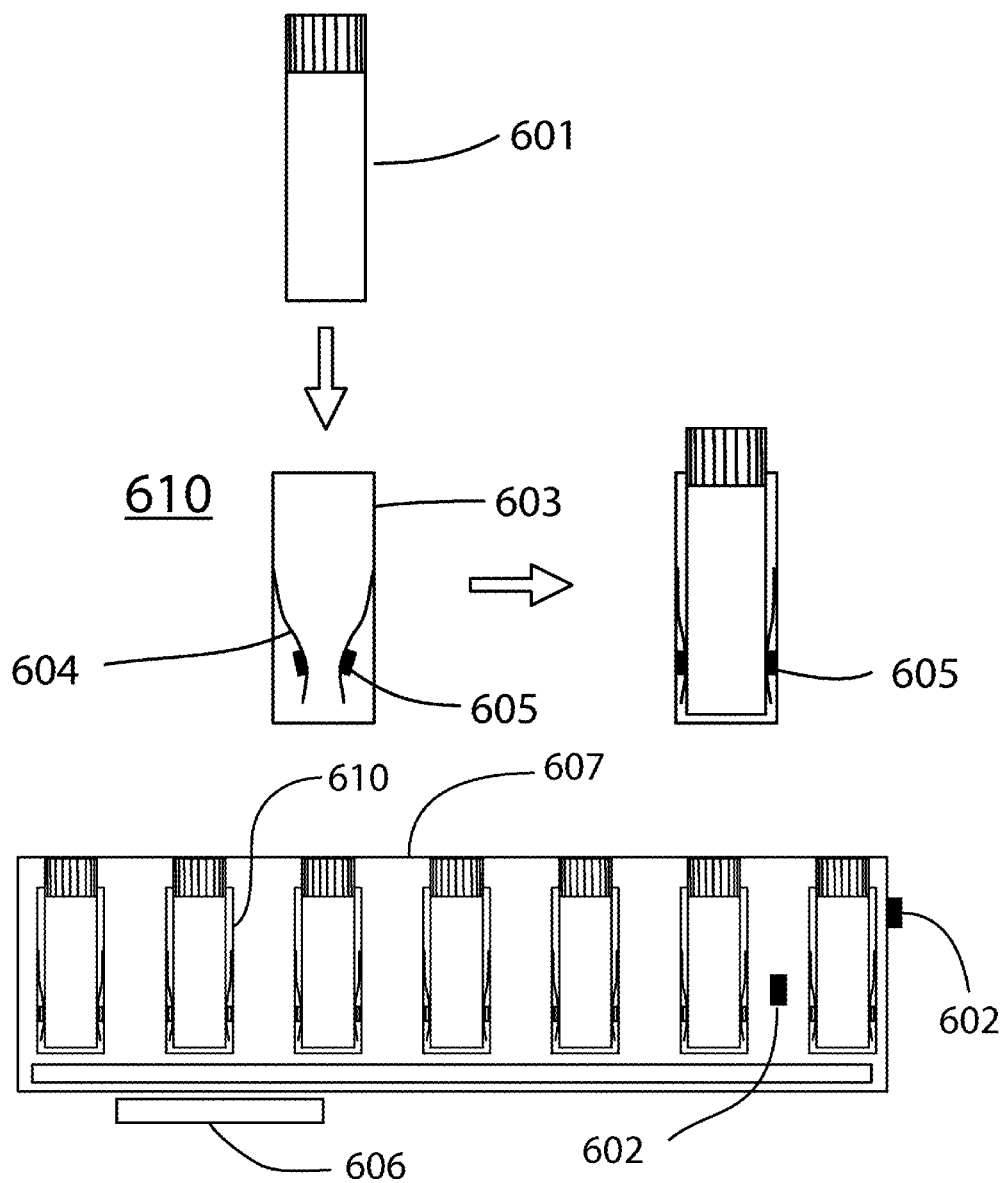
FIG. 6 shows an embodiment in which a temperature sensor is in close physical proximity (and possibly even in contact) with each vial in a sample box.

FIG. 6 shows an embodiment in which a temperature sensor 605 is in close physical proximity (and possibly even in contact) with each vial 601. This embodiment can be implemented in the context of the configuration of FIG. 5 having one or more internal and/or external temperature sensors 602. In addition, each vial 601 would be inserted into the tube of a socket 603 in which one or more metallic springs 604 provide good thermal contact via a thermal conductive path to the vial 601. At least one of the springs 604 would contain a temperature sensor 605. These sensors 605 would also be connected (not shown) to the temperature logging circuitry 606.

The container 607 could contain one or more socket assemblies 610.

Figure 7:
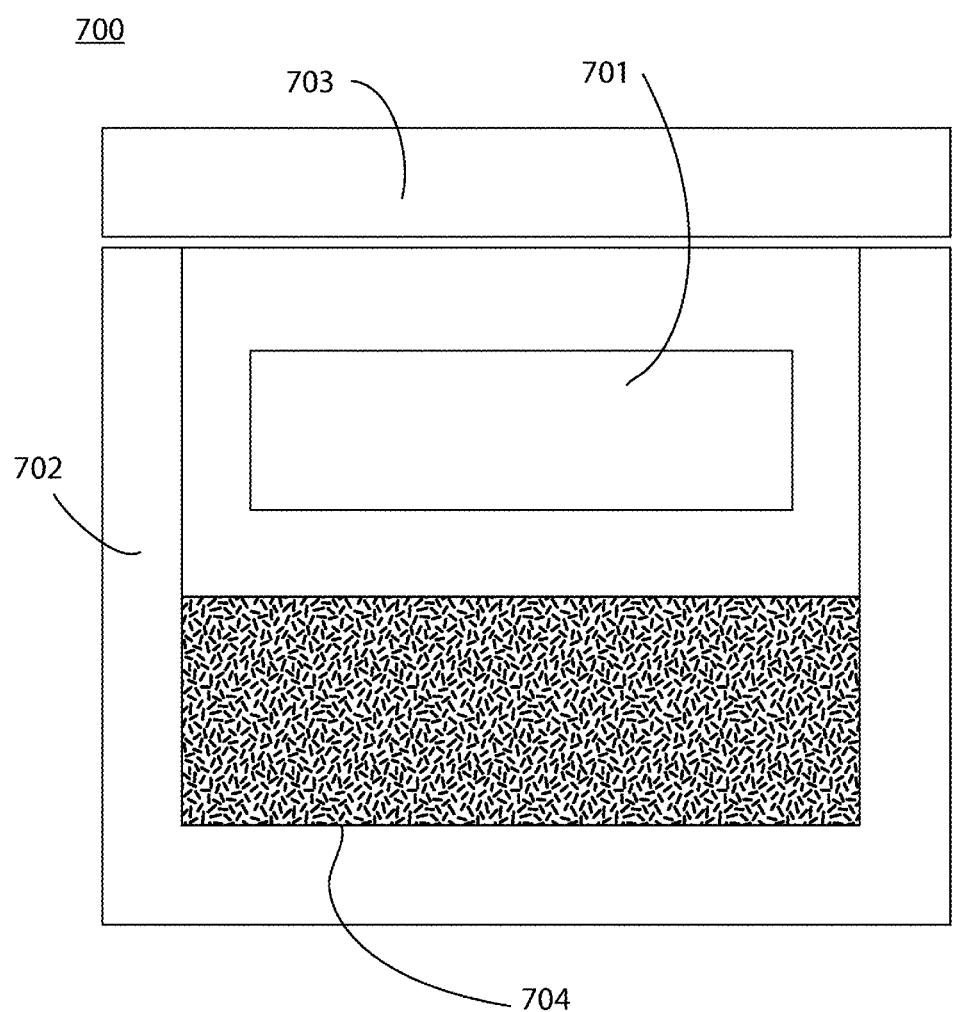
FIG. 7 shows a cross-sectional side view of a variant of the configurations shown in FIGS. 5 and 6.

FIG. 7 shows a cross-sectional side view of a variant 700 of the configurations shown in FIGS. 5 and 6. Here, a container 701, which might be in the form of the previously described containers 502 or 607, is housed in a thermally insulating box 702 with or without a lid 703. In the container base or within its walls is a means 704 of keeping the container cold. This might be in the form of dry ice, liquid nitrogen, a spongy material saturated with liquid nitrogen, or simply a large thermal mass such as a big piece of cold metal.

This arrangement 700 will have the advantage of allowing the samples to be moved about for extended periods of time outside of the freezer while keeping the samples cold. As before, a record of the temperature will be logged and will be available for the user or for updating the database.

A user may keep samples in the monitoring box mapper so that a log of their integrity is recorded.

Methods for Mapping Boxes with Different Organizations

The desktop box mapper described previously can read a sample box with only a certain, predetermined organization, such as one of (8×8), (9×9), or (10×10) sample positions. However, it is common that different bio banking facilities maintain different combinations of box organizations. For example, a certain facility might use (8×8) and (9×9) boxes, while another facility might use (4×4) and (10×10) boxes.

A box mapper is proposed herein that can read different box organizations on different faces of the box mapper. For example, a box mapper can be built so that sample boxes can be read on its top surface and its bottom surface. On one surface, the box mapper is designed to read, say, (9×9) boxes, and, on the other surface, it is designed to read, say, (8×8) boxes. If a user wants to read a (9×9) box, then the box mapper is placed top up. If the user wants to read an (8×8) box, then the box mapper is flipped over. There can be clear markings on the different surfaces to tell the user what box orientation can be presently read by the box mapper.

The box tag will be read by the box mapper, and software will alert the user if he is trying to read a sample box with the wrong box mapper face.

In one implementation, two fully independent box mappers can be housed in the same frame. When a certain box mapper is meant to be used, that box mapper is connected to a computer.

Alternatively, a single communication channel and possibly a single set of box mapper electronics boards can be used when reading either surface. However, only one of the two box mappers will be operational at a time. Activation of which box mapper antenna board can be achieved automatically by using a MEMS accelerometer, a mercury switch, or any other orientation-sensing technology to determine which box mapper is presented to the user.

The above description is of a 2-in-1 box mapper, but an extension to this idea is a cube-shaped box mapper that will allow up to a 6-in-1 box mapper, where a different box organization is supported by each different surface of the cube.

Combination RFID and 2D Barcode Scanners

Figure 8:
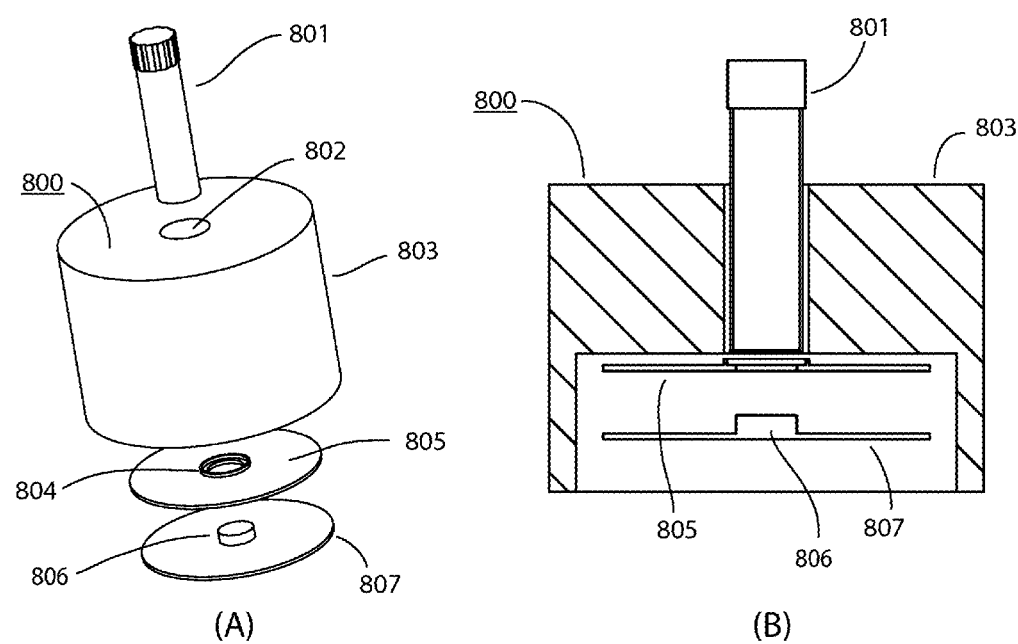
FIGS. 8(A) and 8(B) show exploded and cross-sectional views, respectively, of a single vial reader.

FIGS. 8(A) and 8(B) show exploded and cross-sectional views, respectively, of a single vial reader 800. The device would be connected to a computer via USB or other interface (not shown). This reader will read a vial 801 when it is inserted into the socket 802 in the frame 803. The RFID tag information will be read using an antenna 804 that is mounted on a circuit board 805. This circuit board has a central hole that can be used to image the bottom of the vial labeled with a 2D barcode. This is done using a camera 806 that is mounted on a circuit board 807. This arrangement will allow the automatic entry of the RFID information and 2D barcode information simultaneously into the database running on a host computer.

Figure 9:
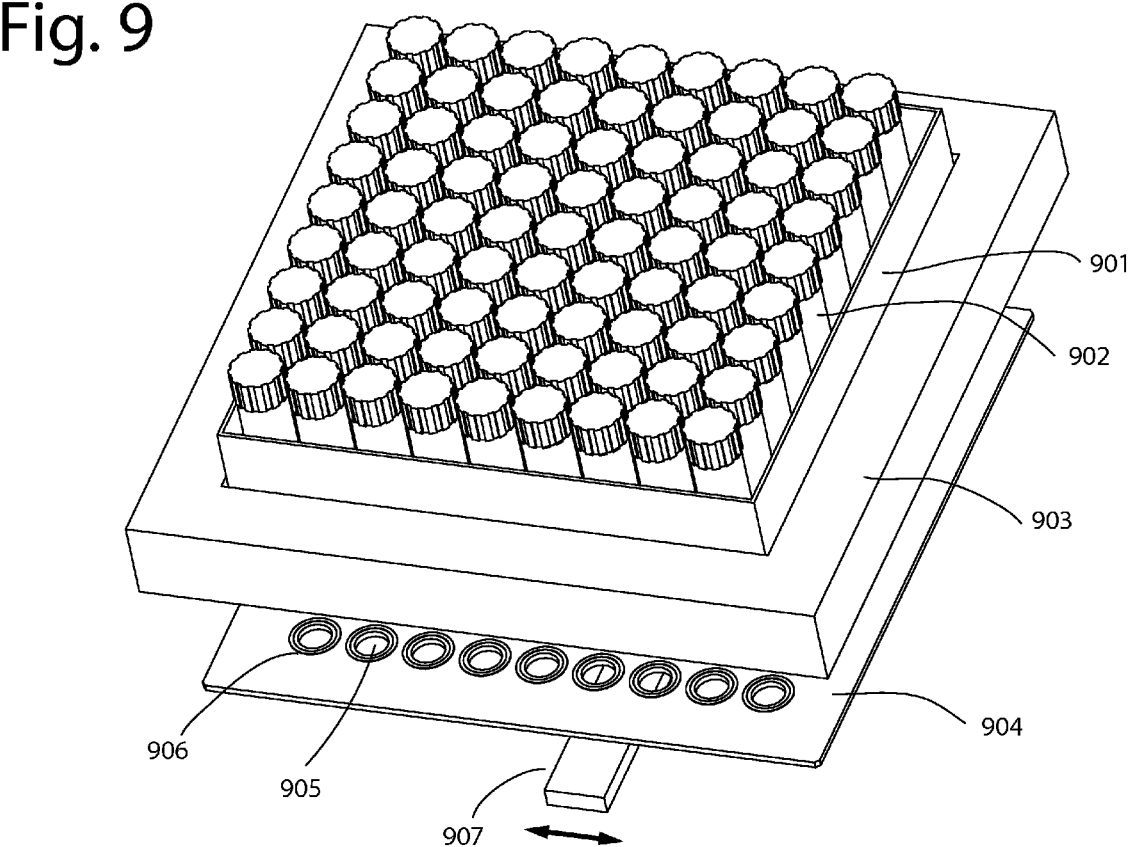
FIG. 9 shows a partially exploded view of a modification of the box mapper of FIG. 1 that enables the reading of both the RFID and barcode information for a box of vials.

FIG. 9 shows a partially exploded view of a modification of the box mapper of FIG. 1 that enables the reading of both the RFID and barcode (1D or 2D) information for a box of vials, where the box has a transparent bottom or holes under each vial. A box 901 of vials 902 is placed in the box mapper 903. In this box mapper, the antenna board 904 has holes 905 in the location of each vial. The antennae 906 used to read the vials' RFID tags surround these holes. This does not impede the reading the RFID tags in the vials. Under the box mapper is a movable optical scanner 907 similar to that used in common flatbed scanners. This scanner can view the vial bottoms and determine the 1D/2D barcode of each vial. Thus, a map of the 1D/2D barcodes and the corresponding RFID information is scanned on one machine and can be added to the database automatically. This will eliminate the need to scan the vials individually or to map the box contents using an RFID-based mapper and a 1D/2D barcode mapper separately and then combining this data.

In another embodiment (not shown) of this dual RFID/barcode box mapper, an individual camera can be mounted beneath each different vial location or beneath each different grouping of two or more adjacent vial locations. This will eliminate moving parts needed to move the scan head 907.

Method for Fabricating an RFID Tag

Figure 10:
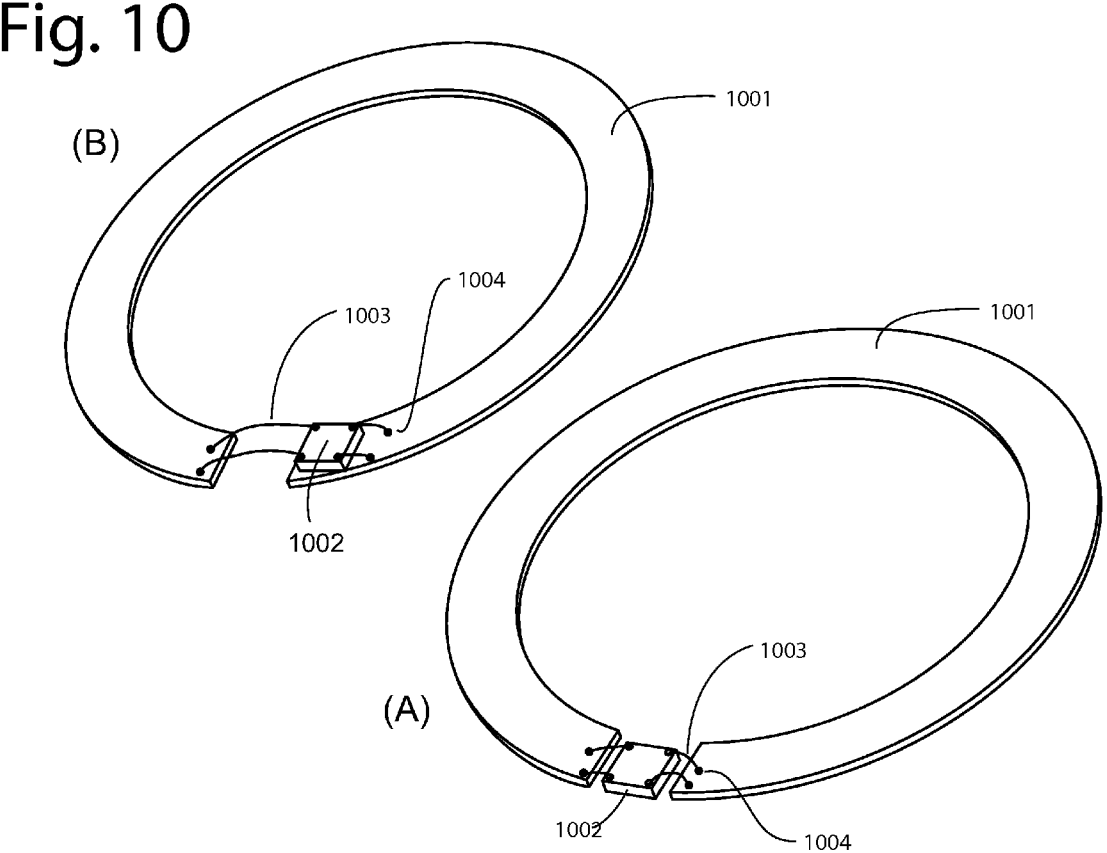
FIGS. 10(A) and 10(B) show RFID tags having an antenna formed from a split metal ring.

FIGS. 10(A) and 10(B) show RFID tags having an antenna 1001 formed from a split metal ring that can be stamped out of sheet metal or electrochemically formed. In the embodiment of FIG. 10(B), antenna 1001 and RFID die 1002 are mounted on the same substrate. RFID die 1002 is electrically connected to the antenna using as many thin wires 1003 as is needed; four are shown in this example. These wires are attached at both ends to the die pads and the antenna, respectively, using wedge or ball wire-bonding connections 1004.

In the alternative embodiment of FIG. 10(A), RFID die 1002 is mounted directly to an appropriate flat surface of the antenna. An insulating layer (not shown) can be added at the antenna/die interface, if needed. This arrangement can add to the mechanical stability of the tag. The die can also be cemented to the substrate/antenna for additional mechanical stability.

The thin wires can flex when temperature causes thermal expansion of the ring. This will allow the entire tag to survive extreme temperature changes such as those encountered when biological samples are stored and removed from ultra-low-temperature storage. Alternatively, the whole tag can be encapsulated with a filled polymer similar to that used to encapsulate electronic chips.

Biphase Antenna

In general, inductively coupled electromagnetic systems transmit energy and data using a base station loop antenna in some proximity to a target device loop antenna. In the downlink path, the base station transmits both energy and data to the target device. In backscatter systems, the target device changes the electrical load on the target device antenna to cause it to absorb more or less energy from the base station. The base station detects these changes and uses them to receive data from the target device in the uplink path.

For both uplink and downlink paths, the energy source is the base station. Current flowing in the base station antenna conductors produces an electromagnetic field which varies in direction and intensity in relation to the distance between the base station antenna conductor elements (as described by the Biot-Savart Law). The target device loop antenna lies in this electromagnetic field. Changes in this electromagnetic field induce voltage and current changes in the target antenna conductors, as described by Faraday's Law of Induction and Maxwell's Equations.

Various factors affect the quality of the coupling between the base station antenna and the target antenna. A standard design method uses a current element model for each antenna. A current element model represents the antenna conductors as a large collection of tiny conductor elements, each carrying a time-varying electrical current in some position and orientation in space. Each base station element produces an effect on each target device element. The combined effects of all circuit elements of the base station antenna summed over all circuit elements of the target device antenna produce the desired net effect on the target device. Some of the effects oppose others, so that the sum effect is smaller than the sum of the magnitudes of the individual parts. All of the effects diminish as the distance between the base station and the target elements increases. These are standard principles of electromagnetic system analysis.

Digit Antenna

Figure 11:
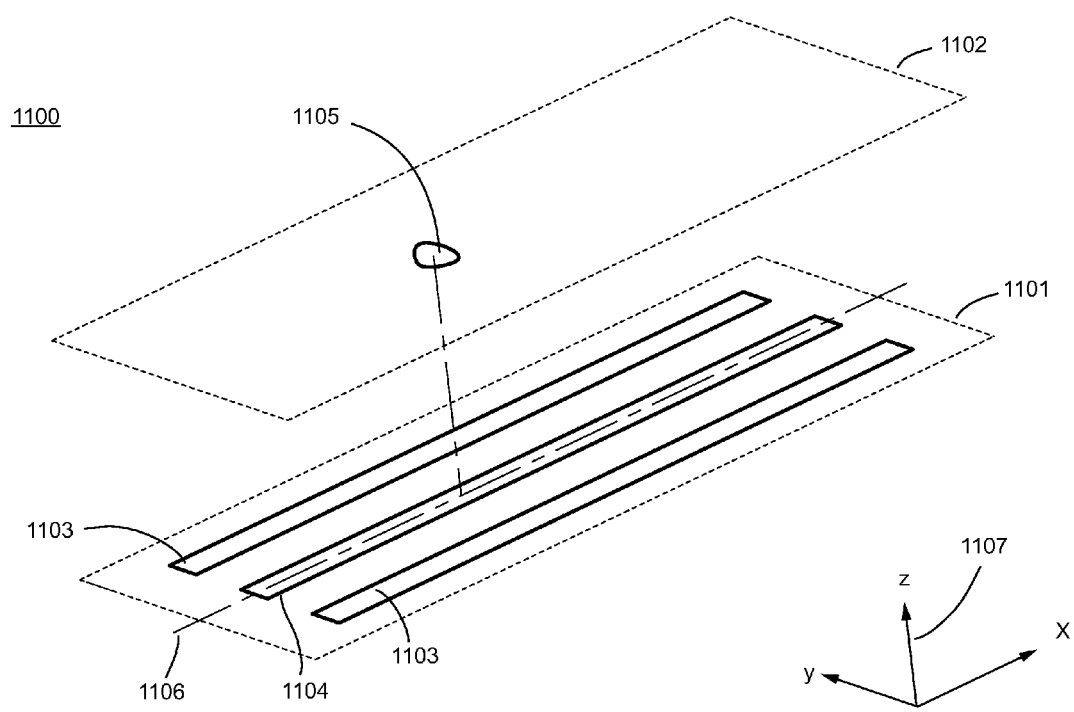
FIG. 11 shows an electromagnetically coupled antenna arrangement for a base station and a target device.

FIG. 11 shows an electromagnetically coupled antenna arrangement 1100 for a base station and a target device. The base station has multiple loop-like antennas 1103 and 1104 mounted on a base plane 1101, where each base station loop antenna has a high aspect ratio, i.e., much longer in one dimension than another, so that each base station loop antenna can be described as a digit antenna having an elongated shape, like a finger of the human hand, as discussed in the '729 application. Multiple digit antennas in the base plane 1101 are oriented in parallel, similar to adjacent fingers of the human hand. A target device, for example, an RFID tag, with a loop antenna 1105 is placed in a target plane 1102, which is parallel to base plane 1101. A design goal of the digit antenna is to couple strongly with a target device placed in the target plane anywhere along the central length of the digit antenna (i.e., the long dimension 1106 of the digit antenna, but approximately centered on the short dimension of the selected digit 1104). Another design goal is for the target device to couple weakly or not at all with the other (non-selected) digit antennas, including the immediately adjacent digit antennas 1103.

A set of orthogonal coordinate axes 1107 is defined, with the X axis parallel to the long axis 1106 of the digit antennas, the Y axis parallel to the short axis of the digit antennas, and the Z axis normal to the base plane 1101 and pointing from the base plane to the target plane 1102. The base plane 1101 is co-planar with the XY plane at Z=0.

In one implementation of this arrangement, antenna arrangement 1100 might have the following properties:
- Target antenna 1105 is roughly circular, with a characteristic diameter D;
- The narrow digit dimension W is roughly comparable to D, being more than D/2 and less than 2D;
- The long digit dimension L is significantly larger than D and W, being at least about 8 W to 10 W;
- The base plane to target plane distance H is less than W and less than D; and
- The distance between adjacent digit antennas is on the order of D and W.

Figure 12:
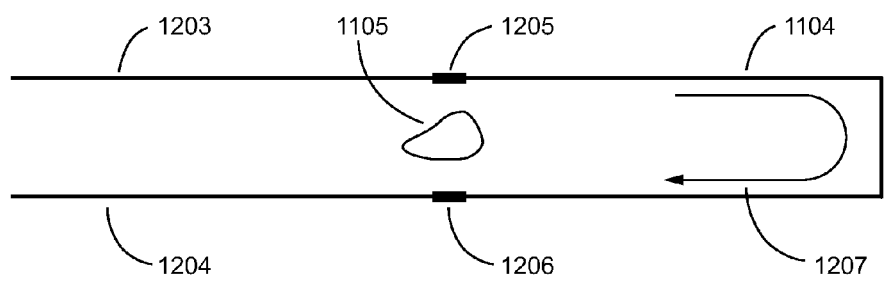
FIG. 12 is a partial view of the antenna arrangement of FIG. 11 looking parallel to the Z axis from above the target plane towards the base plane.

Given these considerations, some current elements of the selected digit antenna 1104 are far more significant than others in producing the cumulative effect on the target antenna 1105. FIG. 12 is a partial view of antenna arrangement 1100 of FIG. 11 looking parallel to the Z axis from above the target plane 1102 towards the base plane 1101. The selected digit antenna 1104 is oriented with the long dimension from left to right in FIG. 12, parallel to the X axis of FIG. 11. The projection of the center of the target antenna 1105 lies on the long axis of the digit antenna 1104 and between the long conductor legs 1203 and 1204 of the digit antenna 1104. The current elements 1205 and 1206 of digit antenna 1104 that are closest to the projection of the target antenna 1105 onto the base plane 1101 contribute the most to the magnetic field seen by the target antenna. Current elements of digit antenna 1104 that are more than distance D away from that projection of the target antenna 1105 have minor contributions. The effective net time-varying current within the target antenna can therefore be approximated by examining the effects from just the two nearest elements 1205 and 1206 of the selected digit antenna 1104.

A conventional implementation of a base station loop antenna drives a conductor at a feed point from a time-varying signal source (not shown). The conductor follows a (clockwise in FIG. 12) looping path 1207 until it returns to a termination point near the feed point. At high frequencies, the conductor is considered as a transmission line that is impedance-matched to the source at the feed point and the termination point to avoid reflections back toward the source. Voltage and current changes at the source point are delayed along the loop conductor. The time delay increases with distance from the feed point, and depends on the propagation velocity c in the transmission line. There may also be reflected waves moving counter-clockwise in FIG. 12.

Consider a current pulse traveling out of the feed point (not shown) and along the upper conductor 1203 from left to right in FIG. 12. When the pulse passes through element 1205, by the right-hand rule, the magnetic field seen by the target antenna 1105 due to this element 1205 points down into the target plane (i.e., into the page of FIG. 12). The pulse continues along clockwise loop 1207 to the right side of FIG. 12, and then returns from right to left along the lower conductor 1204 to the termination point (not shown). Again, by the right-hand rule, the return pulse through element 1206 also causes a magnetic field which points down into the target plane. However, these field contributions occur at different times and will result in the tag being subject to two fields that are out of phase. At any instant, the net effect on the target depends mostly on the current element states nearby at the time, not before or after.

Now, if the source is periodic with frequency f, such as a sine wave generator, then the time-varying current at both elements 1205 and 1206 can be determined. At some point in time, the current reaches a positive peak $i_{max}$ in element 1205. After a time delay t, the current reaches a positive peak in element 1206. But, by then, the current in element 1205 has changed to $i_{max}*\cos(2\pi f t)$. The periodic source causes waves to travel in the finger antenna conductor with phase velocity c and wavelength λ equal to c/f. At some positions of the target device along the digit, the time lag between elements 1205 and 1206 causes the currents at these points to have opposing effects on the target antenna. For instance, if the distance along the conductor from element 1205 to element 1206 is one half the wavelength λ, then the current at element 1205 will always be the same magnitude but opposite in sign to the current at element 1206, so that the two magnetic field effects will cancel at the point on the centerline between elements 1205 and 1206. The magnetic fields will also cancel at z-axis displacements from this center point, including at the center of the target antenna 1105. Even though current elements nearby to elements 1205 and 1206 will still have net effects which are not completely canceled, the total effect on the target antenna 1105 will still be greatly reduced, so that coupling to the target device is relatively poor at this position. This is a significant problem with conventional designs: position-dependent canceling of effects from the forward and return paths cause dramatic changes in coupling to the target antenna.

Biphase Digit Antenna

The position-dependent cancellation described above can be avoided by replacing the single feed point with two feed points, and causing two waves to travel simultaneously along parallel base antenna conductors to respective termination points. This topology is shown in FIG. 13(A). The original signal source 1301 now drives a biphase converter 1302, which produces the top feed output 1303 and the bottom feed output 1304, as shown in the figure. The biphase converter causes the feed point voltages to be of opposite polarity at the feed points, for a periodic signal of frequency f. The waves in each respective antenna conductor will both travel from left to right in FIG. 13(A), with the same time delay to each position of target antenna 1305 along the biphase digit antenna. The conductors terminate at their characteristic impedances at termination points 1306 and 1307, to minimize the strength of any reflected pulses. Therefore, for any target position, the currents from both conductors 1303 and 1304 will be in opposite directions close to the target. For example, if the current through the adjacent top current element 1308 at some instant is positive, then the magnetic field from that element will once again point down into the target plane. At the same time, the current through the adjacent bottom current element 1309 will be negative and will contribute to the magnetic field pointing down into the target plane. Thus, the two current elements contribute magnetic fields in the same direction. At any target position, the two conductors always produce approximately the same combined field near the center of the target antenna, and the coupling is consistent along the length of the digit antenna. Traces from an actual circuit board implementation of this antenna arrangement are shown in FIG. 13(B). Four digit antennas are shown, arranged in parallel. The feed points are on the left in the figure, and the termination points are on the right. Feed structures and components and terminators are implemented on other layers, which are not shown in the figure. The scale indicator establishes exemplary dimensions of the antenna.

Biphase converter 1302 of FIG. 13(A) can be constructed using various methods, including but not limited to the following:

Method 1: A differential driver can be used, which reproduces the original source at one feed point with a gain G, and at the other feed point with a gain of −G, and with a comparable delay from the single input to each output. This device will function independently of the source frequency f, since the outputs are always opposite in sign.

Method 2: A biphase converter incorporating a single-ended-to-differential balun can be used. A device such as a balun part 0900BL18B100E from Johanson Technology Inc. of Camarillo, Calif., will perform this function near 900 MHz. Alternatively, a printed circuit-implemented splitter can be used. An example of this is a Marchand balun, which has been described in the engineering and scientific literature. This method has the advantage of being fully implemented in the printed circuit traces and does not require any external components.

Method 3: A splitter followed by a delay element in one of the output paths can be used, so that a periodic source with design frequency $f_0$ will have an added delay to one of the feed points by one half of the period $T_0=1/f_0$. For a sinusoidal or 50% duty cycle square wave source, the two feed points will always be opposite in sign when the source has a frequency $f_0$. For sources with other wave forms and frequencies, the feed points will not be necessarily opposite in sign. However, even for those cases, the two conductor paths will generally contribute reinforcing electromagnetic field changes to the target device antenna, especially near the design frequency $f_0$. For example, at a design frequency of 915 MHz, the delay element will produce a net additional delay at the bottom feed point of 546 ps. At a different frequency of 930 MHz, the bottom feed point will produce an output which differs by the ratio $\cos(2 \pi f T_0)$ or $\cos(\pi 930/915)$, or 0.9987. Instead of a comparable current in the lower conductor, the lower current would be different by about 0.13%.

Various methods can be used to produce the net output delay for a biphase converter of this third type, including:

Delay Method 1: There can be a longer path to the feed output, with a propagation delay of $t_0$. The conductors in this path should be arranged to avoid electromagnetic coupling with the target device, perhaps by placing the delay path far from the digit antenna.

Delay Method 2: An electronic part designed to produce propagation delay, such as a Surface Acoustic Wave (SAW) device.

Delay Method 3: A microstrip delay line can be implemented on a printed circuit board (PCB) which places a ground plane between the delay line and the base station antenna, perhaps with another ground plane farther away. In this design, there are at least four PCB layers: a top base station antenna layer, a ground plane, a delay line layer, and another bottommost ground plane. The ground planes also serve to isolate the base station from other unrelated target and base station antennas below the bottommost ground plane. The microstrip delay line can be implemented with various topologies, including (A) a spiral with a via hole at the center end to route the input or output to other parts of the circuit, (B) a back and forth serpentine delay line, or (C) a nested spiral where a forward path spirals in to the center, then reverses direction, as shown in FIG. 13(C). Two interchangeable attachment points appear on the left. One attachment point is an input to the delay path, and the other attachment point is an output. The delay structure has two ground plane layers (not shown): one above and one below the layer shown. The attachment points connect through one of the ground layers to an antenna layer as shown in FIG. 13(B). One of the attachment points connects through the other ground layer to the base station driver (for a transmit antenna) or receiver (for a receive antenna) or circulator (for a transmit/receive antenna). The scale indicator establishes exemplary dimensions of the delay path.

For bidirectional communication with the tag, a uplink path is required for information to flow from the tag to the base station. For a backscatter system, the tag modifies the impedance between the connections to terminals of any attached antennas. The impedance changes affect the amount of current induced in a tag loop antenna by the base station transmitter antenna. By Lenz's Law, current induced in the tag antenna produces a magnetic field opposite to the field causing the current, effectively reducing the ambient magnetic field. After a time delay due to the round-trip path from the base station to the tag and back, the magnetic field changes from the tag affect the base station transmit antenna, and any additional nearby conductor.

Figure 13:
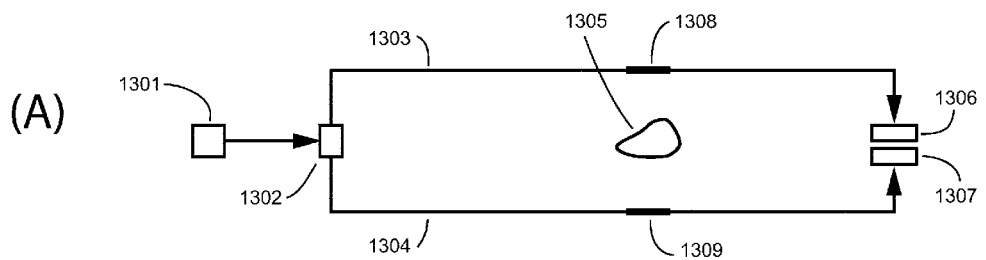
FIG. 13(A) shows the topology of a biphase digit antenna.
FIG. 13(B) shows circuit board traces for a set of four biphase digit antennae of FIG. 13(A)
FIG. 13(C) shows a microstrip delay line implemented as a nested spiral.
Figure 13:
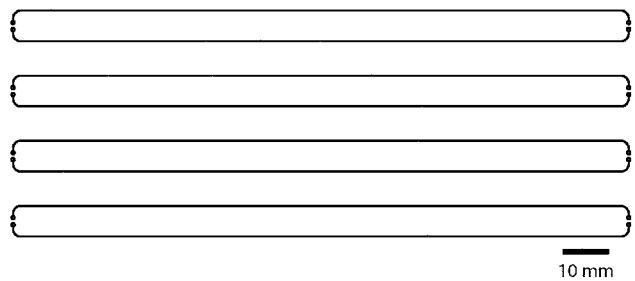
Figure 13:
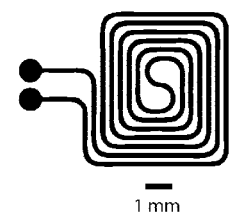

The biphase digit antenna of FIG. 13 can be used in the context of a box mapper, such as box mapper 101 of FIG. 1. However, a biphase digit antenna can also be used in other applications, including, but not limited to, the antenna arrangements of the '729 application.

Uplink with One Base Station Antenna

For a base station with a bidirectional base station antenna, the tag field changes result in (usually small) changes in the apparent impedance of the base station antenna conductors. In the absence of a tag, the base station source driver, conductors, and antenna segment terminators are all theoretically matched. This matching minimizes or eliminates any reflection of the transmit pulses back toward the source feed points. When the tag alters the field from the base station, it intermittently distorts this theoretically perfect impedance matching. When tag energy absorption is higher, there is a larger deviation in the impedance match of the base station antenna conductors. The reflection from this impedance mismatch causes a return pulse to travel back toward the base station source. If, for instance, the tag decreases its impedance, absorbing more energy, then this is equivalent to briefly introducing a low-impedance alternative path to ground in the region of the base antenna conductor near the tag. A positive pulse on a conductor is reduced in voltage by the induced reflection. This negative reflection pulse travels both ways on the antenna conductor: forwards towards the terminator, where it is dissipated, and backwards to the feed point. For a biphase antenna as discussed above, there is a corresponding negative pulse from the feed point on the companion antenna conductor, and there is a corresponding positive reflection pulse on that companion conductor. Two reflections thus travel on the base antenna conductors back toward the respective feed points: one positive and one negative. When the base station incorporates a passive biphase converter, such as a delay path for one of the conductors, one of the return pulses travels back through the delay path and recombines with the other return pulse. Since, by design, the delay path shifts one pulse by half of the time period of a periodic pulse, the delayed pulse adds constructively to the undelayed pulse.

The base station biphase converter may be fed from a device such as a three-port circulator, with a unidirectional driver feeding one port, a second port sending and receiving from the biphase converter, and a third port driving a unidirectional receiver. In this case, the combined, reflected pulses will be delivered to a receiver decoder mechanism via the circulator.

In cases where the biphase converter is unidirectional in the delayed path, the reflection from the undelayed antenna conductor may be used to provide a signal to the receiver. The reflection from the delay path antenna conductor will be discarded.

Uplink with Independent Base Station Receive Antenna

The base station may be implemented with an independent receive antenna. Changes in current flowing in the base station transmit antenna conductors and in the tag all cause electromagnetic field changes, which may induce currents in other nearby conductors. The base station may contain other biphase digit antennas, similar in design to the biphase transmit antenna. In this topology, for the transmit antenna, the transmitter driver connects directly to a biphase converter, and through that to transmit antenna conductors. Reflected tag pulses on these conductors are discarded. For the receive antenna, the receive antenna conductors connect to a reverse path biphase combiner, which combines the reflected tag pulse from one receive antenna conductor with a delayed, reflected tag pulse from the other receive antenna conductor. The combiner may be a passive device identical in design to a passive transmit antenna biphase converter, just with the pulse flow reversed. The output of the combiner is then connected to the same type of receiver decoder mechanism as for the bidirectional base station antenna. In the direction away from the combiner, the receive antenna conductors should be terminated at their characteristic impedances in order to absorb the tag pulses traveling on these conductors in the direction away from the combiner.

In the previous descriptions, each individual digit antenna is used for both the transmit and receive functions, as in the '729 application. An alternative implementation, however, would be to separate the transmit and receive functions of the digit antennae. For example, in a base station antenna arrangement having mutually orthogonal sets of horizontal and vertical digit antennae, as in FIG. 16(A) of the '729 application, the horizontal digit antennae could be used to transmit to the RFID tag, and the vertical digit antennae could be used to receive the signal from the tag, or vice versa. To read a tag located at row 3 (r3), column 7 (c7) of a sample box, using this implementation, the transmit antenna in row 3 would be activated, and the receive antenna in column 7 would be activated. Ideally, the only tag that would be both activated and read would be the tag at position (r3,c7). Although all of the other tags in row 3 would respond to the activation of the transmit antenna, the receive antenna in column 7 would not be able to detect those other tags on the basis of their weaker signal strengths. Even if they did respond they could be recognized and discounted due to the reduced signal strength.

Modified String of Pearls Antennae

Figure 14:
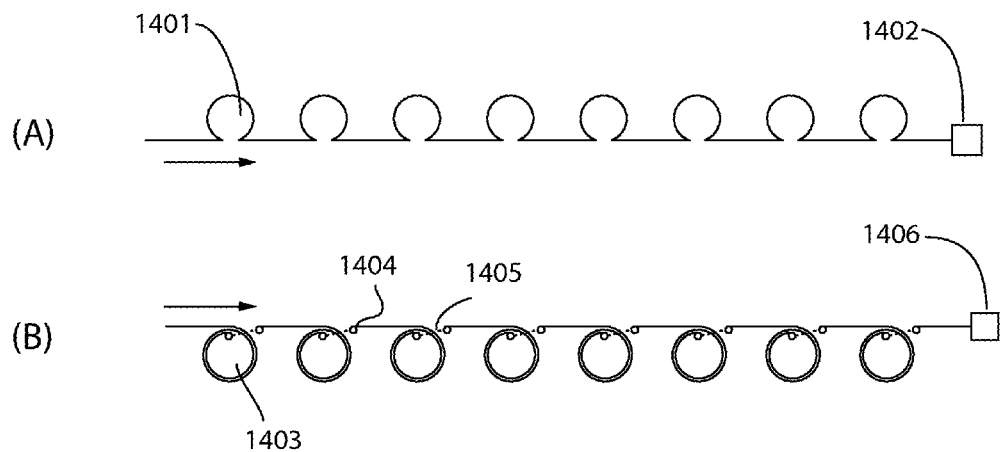
FIGS. 14(A) and 14(B) show alternative arrangements to the digit antenna presented in FIG. 13(A).

FIG. 14 shows alternative arrangements to the digit antenna presented in FIG. 13(A). In the arrangement of FIG. 14(A), the individual vials are read using a coil 1401 of almost one complete turn. Here, the signal is entering from the left in the figure. If the characteristic dimension of the conductor length (e.g., 2 cm) in a loop is much smaller than the wavelength of the propagating signal (e.g., 20 cm), then the phase variation along the small structure is relatively small. Thus, the electromagnetic field variation along the coil will be negligible, providing a relatively strong signal that will enable a tag to be read if placed above the coil. At the far end of the path, the signal is terminated through an appropriate impedance 1402 to ground, thus reducing reflections.

Note that this design is single ended, thus eliminating components (for example, baluns) in the read/transmit path needed to split the signal into two paths, as in FIG. 13(A). This component reduction increases the signal available to the tag and the signal arriving at the receiver due to reduction in the attenuation these components cause.

Similarly, using the same reasoning as before, a single- or multi-turn coil can be produced as shown in FIG. 14(B). Here, each coil 1403 has two turns that are completed using vias 1404 and an internal trace 1405 that is in a different layer of the printed circuit board. This path is terminated as before at an appropriate impedance 1406.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this disclosure may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

What is claimed is:

1. Apparatus having a box mapper, the box mapper comprising:
    a frame configured to receive a sample box of RFID-tagged sample vials; and
    a set of antennas configured to read the vial RFID tags of the sample vials to determine identity and position of each sample vial in the sample box, wherein the sample box does not have antennas configured to read the vial RFID tags of the sample vials stored in the sample box.

2. The invention of claim 1, wherein the box mapper further comprises means for conveying information regarding the sample vials to an external computer.

3. The invention of claim 1, wherein a first antenna of the box mapper is configured to read a box RFID tag of the sample box to determine orientation of the sample box within the frame.

4. The invention of claim 3, wherein the first antenna of the box mapper is configured to read both the box RFID tag of the sample box and a vial RFID tag of a sample vial in the sample box.

5. The invention of claim 1, wherein the box mapper comprises circuitry for receiving temperature information corresponding to one or more sample vials in the sample box.

6. The invention of claim 5, wherein the temperature information is based on signals generated by one or more temperature sensors located near the one or more sample vials.

7. The invention of claim 6, wherein at least one temperature sensor is mounted on the sample box.

8. The invention of claim 6, wherein at least one sample vial is placed within a socket having at least one temperature sensor.

9. The invention of claim 8, wherein the socket has one or more metallic springs configured to be deformed when the sample vial is received by the socket, wherein the temperature sensor is mounted on a metallic spring to provide a thermal conductive path between the sample vial and the temperature sensor.

10. The invention of claim 1, wherein the set of antennas are mounted on a substrate having apertures that allow optical viewing of the sample vials through the apertures.

11. The invention of claim 10, wherein the box mapper further comprises a scanner configured to move relative to the substrate to generate electronic images of the sample vials through the apertures.

12. The invention of claim 1, wherein:
the box mapper is configured to map sample boxes having a first box configuration; and
the apparatus comprises at least one other box mapper configured to map sample boxes having a second box configuration different from the first box configuration.

13. The invention of claim 12, wherein the apparatus has two box mappers on opposing sides of the apparatus, such that the apparatus can be positioned (i) with a first orientation to map sample boxes having the first box configuration and (ii) with a second orientation, rotated 180 degrees with respect to the first orientation, to map sample boxes having the second box configuration.

14. The invention of claim 12, wherein the apparatus has a solid rectangular shape with up to six different box mappers, one on each side of the solid rectangular shape, to map sample boxes having up to six different box configurations.

15. The invention of claim 1, wherein at least one vial RFID tag comprises:
an RFID tag antenna formed of a split metal ring having a gap between two ends of the split metal ring; and
an RFID tag die electrically connected to both ends of the split metal ring of the RFID tag antenna via wires.

16. The invention of claim 15, wherein the RFID die is mounted over the split metal ring.

17. The invention of claim 15, wherein the RFID die is mounted within the gap of the split metal ring.

18. The invention of claim 1, wherein at least one of the antennas is a digit antenna having an elongated shape with its length greater than its width.

19. The invention of claim 18, wherein the digit antenna is a biphase digit antenna comprising:
a first antenna conductor corresponding to a first half of the elongated shape of the biphase digit antenna;
a second antenna conductor corresponding to a second half of the elongated shape of the biphase digit antenna; and
a biphase converter configured to convert an applied signal into a first signal component and a second signal component, out of phase with the first signal component, wherein:
the first signal component is applied to the first antenna conductor; and
the second signal component is applied to the second antenna conductor.

20. The invention of claim 19, wherein the net electromagnetic field generated by the first and second signal components enables the box mapper to read a vial RFID tag located at any position along a central length of the biphase digit antenna.

21. The invention of claim 19, wherein the biphase digit antenna further comprises a termination impedance at an end of each of the first and second antenna conductors distal from the biphase converter.

22. The invention of claim 19, wherein the biphase converter comprises:
a splitter configured to split the applied signal into two split components; and
a delay element connected to delay one of the split components to produce the second signal component out of phase with the first signal component.

23. The invention of claim 22, wherein the delay element is a microstrip delay line having a nested spiral shape.

24. The invention of claim 19, wherein the biphase converter comprises a balun.

25. The invention of claim 18, wherein the digit antenna comprises a conductor configured in a sequence of connected coils, each coil corresponding to a different possible vial position along a row or column of the sample box.

26. The invention of claim 25, wherein at least one coil corresponds to a loop having an almost complete turn.

27. The invention of claim 25, wherein at least one coil corresponds to a single- or multi-turn coil.

28. The invention of claim 18, wherein a first plurality of the antennas are co-planar digit antennas configured side by side with their lengths parallel to one another, such that each digit antenna corresponds to a different row or column of sample vials in the sample box.

29. The invention of claim 28, wherein a second plurality of the antennas are co-planar, side-by-side digit antennas, mutually orthogonal to the first plurality.

30. The invention of claim 29, wherein:
the first plurality are configured to transmit signals to the vial RFID tags; and
the second plurality are configured to receive signals from the vial RFID tags.

31. Apparatus comprising a biphase digit antenna having an elongated shape with its length greater than its width, the biphase digit antenna comprising:
a first antenna conductor corresponding to a first half of the elongated shape of the biphase digit antenna;
a second antenna conductor corresponding to a second half of the elongated shape of the biphase digit antenna; and
a biphase converter configured to convert an applied signal into a first signal component and a second signal component, out of phase with the first signal component, wherein:
the first signal component is applied to the first antenna conductor; and the second signal component is applied to the second antenna conductor.

32. The invention of claim 31, wherein the biphase converter is configured to generate the second signal component about 180 degrees out of phase with the first signal component.

33. The invention of claim 31, wherein the net electromagnetic field generated by the first and second signal components enables the box mapper to read a vial RFID tag located at any position along a central length of the biphase digit antenna.

34. The invention of claim 31, wherein the biphase digit antenna further comprises a termination impedance at an end of each of the first and second antenna conductors distal from the biphase converter.

35. The invention of claim 31, wherein the biphase converter comprises:
   a splitter configured to split the applied signal into two split components; and
   a delay element connected to delay one of the split components to produce the second signal component out of phase with the first signal component.

36. The invention of claim 35, wherein the delay element is a microstrip delay line having a nested spiral shape.

37. The invention of claim 31, wherein the biphase converter comprises a balun.

38. A vial reader comprising:
   a frame configured to receive a sample vial having a vial RFID tag;
   an antenna configured to read the vial RFID tag, with the sample vial received by the frame; and
   a camera configured to image the sample vial, with the sample vial received by the frame.

39. The invention of claim 38, wherein the vial reader enables the RFID tag to be read and the sample vial to be imaged simultaneously with the sample vial received by the frame.

40. The invention of claim 38, wherein the frame has a socket for receiving a single sample vial at a time.

41. The invention of claim 38, wherein the antenna is mounted on a circuit board having an opening through which the camera views an end of the sample vial with the sample vial received by the frame.

42. An RFID tag comprising:
   an RFID tag antenna formed of a split metal ring having a gap between two ends of the split metal ring; and
   an RFID tag die electrically connected to both ends of the split metal ring of the RFID tag antenna via wires.

43. The invention of claim 42, wherein the RFID die is mounted over the split metal ring.

44. The invention of claim 42, wherein the RFID die is mounted within the gap of the split metal ring.

45. A socket for receiving a sample vial, the socket comprising:
   a tube configured to receive the sample vial;
   one or more metallic springs configured to be deformed when the sample vial is received by the tube; and
   at least one temperature sensor mounted on a corresponding metallic spring, wherein:
      the metallic spring provides a thermal conductive path between the sample vial and the temperature sensor; and
      the temperature sensor enables a temperature history for the sample vial to be generated.

46. Apparatus having a box mapper, the box mapper comprising:
   a frame configured to receive a sample box of RFID-tagged sample vials; and
   a set of antennas configured to read the vial RFID tags of the sample vials to determine identity and position of each sample vial in the sample box, wherein:
      the box mapper comprises circuitry for receiving temperature information corresponding to one or more sample vials in the sample box;
      the temperature information is based on signals generated by one or more temperature sensors located near the one or more sample vials; and
      at least one sample vial is placed within a socket having at least one temperature sensor.

47. The invention of claim 46, wherein at least one temperature sensor is mounted on the sample box.

48. The invention of claim 46, wherein the socket has one or more metallic springs configured to be deformed when the sample vial is received by the socket, wherein the temperature sensor is mounted on a metallic spring to provide a thermal conductive path between the sample vial and the temperature sensor.

49. Apparatus having a box mapper, the box mapper comprising:
   a frame configured to receive a sample box of RFID-tagged sample vials; and
   a set of antennas configured to read the vial RFID tags of the sample vials to determine identity and position of each sample vial in the sample box, wherein the set of antennas are mounted on a substrate having apertures that allow optical viewing of the sample vials through the apertures.

50. The invention of claim 49, wherein the box mapper further comprises a scanner configured to move relative to the substrate to generate electronic images of the sample vials through the apertures.

51. Apparatus having a box mapper, the box mapper comprising:
   a frame configured to receive a sample box of RFID-tagged sample vials; and
   a set of antennas configured to read the vial RFID tags of the sample vials to determine identity and position of each sample vial in the sample box, wherein:
      the box mapper is configured to map sample boxes having a first box configuration; and
      the apparatus comprises at least one other box mapper configured to map sample boxes having a second box configuration different from the first box configuration.

52. The invention of claim 51, wherein the apparatus has two box mappers on opposing sides of the apparatus, such that the apparatus can be positioned (i) with a first orientation to map sample boxes having the first box configuration and (ii) with a second orientation, rotated 180 degrees with respect to the first orientation, to map sample boxes having the second box configuration.

53. The invention of claim 51, wherein the apparatus has a solid rectangular shape with up to six different box mappers, one on each side of the solid rectangular shape, to map sample boxes having up to six different box configurations.

* * * * *